US007272886B2

(12) United States Patent
Thomson

(10) Patent No.: US 7,272,886 B2
(45) Date of Patent: Sep. 25, 2007

(54) BEARING PRESS SUPPORT ADAPTOR

(76) Inventor: David John Thomson, 48 Garro St., Sunnybank Hills, QLD 4109 (AU)

( * ) Notice: Subject to any disclaimer, the term of this patent is extended or adjusted under 35 U.S.C. 154(b) by 176 days.

(21) Appl. No.: 10/512,110

(22) PCT Filed: Mar. 20, 2003

(86) PCT No.: PCT/AU03/00338

§ 371 (c)(1),
(2), (4) Date: Dec. 21, 2004

(87) PCT Pub. No.: WO03/091011

PCT Pub. Date: Nov. 6, 2003

(65) Prior Publication Data
US 2005/0086781 A1 Apr. 28, 2005

(30) Foreign Application Priority Data
Apr. 26, 2002 (AU) .................. PS1945

(51) Int. Cl.
B23P 19/04 (2006.01)
B21D 53/10 (2006.01)

(52) U.S. Cl. .............. 29/724; 29/898.08; 29/426.5; 29/898.07; 29/256; 29/258; 29/257; 29/266; 29/260

(58) Field of Classification Search .......... 29/724, 29/426.5, 256, 266, 258, 257, 263, 898.08, 29/898.07, 259, 260
See application file for complete search history.

(56) References Cited

U.S. PATENT DOCUMENTS 2,288,906 A * 7/1942 Kaplan ................. 29/260
2,408,450 A * 10/1946 Schrader ................ 81/53.2
2,421,324 A * 5/1947 Graham ................. 29/283
2,650,419 A * 9/1953 Barbisch ................ 29/266
2,677,174 A * 5/1954 Lee ..................... 29/259
3,403,434 A * 10/1968 Calabro ................. 29/724
3,846,891 A * 11/1974 Elg ..................... 29/261
4,057,889 A * 11/1977 Ferguson ............... 29/426.5
4,437,220 A * 3/1984 Gregory ................ 29/426.5
4,471,517 A * 9/1984 Denmeade et al. ......... 29/259
4,646,412 A * 3/1987 Eade .................... 29/259
4,771,528 A * 9/1988 Stromberg .............. 29/259
4,908,925 A * 3/1990 Johnson ................ 29/260
4,989,311 A * 2/1991 Rosin .................. 29/259
4,989,312 A * 2/1991 Maddalena ............. 29/259
5,349,736 A * 9/1994 Rubino et al. ........... 29/426.5
5,836,078 A * 11/1998 Aiken et al. ........... 29/898.07
6,012,211 A * 1/2000 Ochoa et al. ........... 29/426.5
6,212,775 B1 * 4/2001 Sarver et al. .......... 29/898.08
6,327,773 B1 * 12/2001 Rode .................... 29/724
6,467,147 B2 * 10/2002 Iwata et al. ............ 29/426.5

FOREIGN PATENT DOCUMENTS

| AU | 35386/00 | 11/2000 |
| EP | 428462 A1 | 2/1991 |
| GB | 2308566 A | 7/1997 |
| IE | 904110 | 5/1991 |

OTHER PUBLICATIONS

International Search Report for PCT/AU03/00338 (May 13, 2003).

* cited by examiner

Primary Examiner—Essama Omgba
(74) Attorney, Agent, or Firm—Howrey LLP

(57) ABSTRACT

A support adaptor assembly for a bearing press comprising a rectangular shaped header plate (1), a pair of adjustable support rods (4) each with an adaptor (9) on one end for providing a means of supporting an object (50) to be worked on with a bearing press either above or below the support members of the bearing press.

6 Claims, 5 Drawing Sheets

BEARING PRESS SUPPORT ADAPTOR

This is a national stage filing under 35 U.S.C. § 371 of International Application No. PCT/AU03/00338 filed Mar. 20, 2002, which claims priority based on Australian Patent Application No. PS 1945 filed Apr. 26, 2002.

BACKGROUND OF THE INVENTION

This invention relates to a device (hereinafter referred to as a "support adaptor assembly") which can be fitted to a pressing device (hereinafter referred to as a "bearing press") used for removing or for fitting press-fitted components such as bearings, gears, pulleys, pins, bushes and seals.

Conventional bearing presses comprise a support frame having a base section, two spaced apart elongate side members extending upwards from the base section, and a fixed mounting member to which is connected a mechanically or hydraulically operated pressing device. Attached to the elongate side members of the support frame by pins or bolts, are two parallel, horizontal, spaced apart support members used to support a component to which pressure is applied by operation of the pressing device.

There are many variations of this configuration, but all known prior art bearing presses have two parallel, horizontal, spaced apart support members, above which is mounted a pressing device.

In use, an object requiring assembly or dismantling of press-fitted components, is placed on the support members of the bearing press, or on plates supported by the support members of the bearing press, so that the pressing device can be operated to apply vertical, downward pressure on the object to remove or replace the press fitted components. In order to prevent damage to components and injury to the operator of the bearing press, the component to which pressure is applied must be on a horizontal plane relative to the vertical direction of the downward pressing force.

There are, however, some objects with press-fitted components, which cannot be correctly aligned with a horizontal plane or supported on the support members of a bearing press for the following reasons:

a) the object may be too long to fit between the pressing device and the horizontal support members of the bearing press. Even when the support members have a means of height adjustment, this is often a difficult and time consuming process;

b) the object may be too wide to fit between the horizontal support members of the bearing press;

c) the object may be of an irregular shape which does not allow it to be supported in such a way that places the component to be fitted or removed with a horizontal plane relative to the vertical direction of the downward pressing force;

d) the object may comprise two components of similar width or diameter which are press fitted together and must be separated by use of a pressing force for repairs.

OBJECT OF THE INVENTION

It is the object of the present invention to reduce the disadvantages of bearing presses as described above, by providing a means by which objects with press-fitted components can be supported in suspension above or below the horizontal support members of the bearing press.

STATEMENT OF THE INVENTION

According to the present invention, there is provided a support adaptor assembly which can be fitted to a bearing press into which objects requiring removal or installation of press-fitted components, such as bearings, can be placed and supported whilst pressure is applied from the pressing device. Said support adaptor assembly providing a means for supporting objects in suspension above or below the support members of the bearing press.

It is preferred that the support adaptor assembly includes a rectangular header plate which includes a means for mounting it centrally either on the frame of the bearing press above the pressing device or on the pressing device itself where the pressing device includes a means of mounting it.

It is preferred that the rectangular header plate contains a slot in either end to enable a pair of elongate support rods to be vertically attached to the support plate by means of nuts above and below the header plate in a manner which allows adjustment of the width by which the support rods are spaced apart.

It is preferred that the two support rods have a means of adjustment of the length by which they extend below the rectangular header plate.

It is preferred that each support rod has a means for mounting an adaptor which provides a means for supporting an object with press-fitted components which requires use of a bearing press for assembly or dismantling, but cannot be supported on the support members of the bearing press.

According to the present invention, there is also provided in combination, the above described support adaptor assembly and bearing press.

The present invention can be embodied in many ways without departing from the spirit and scope described above.

DETAILED DESCRIPTION OF THE INVENTION

Figure 1:
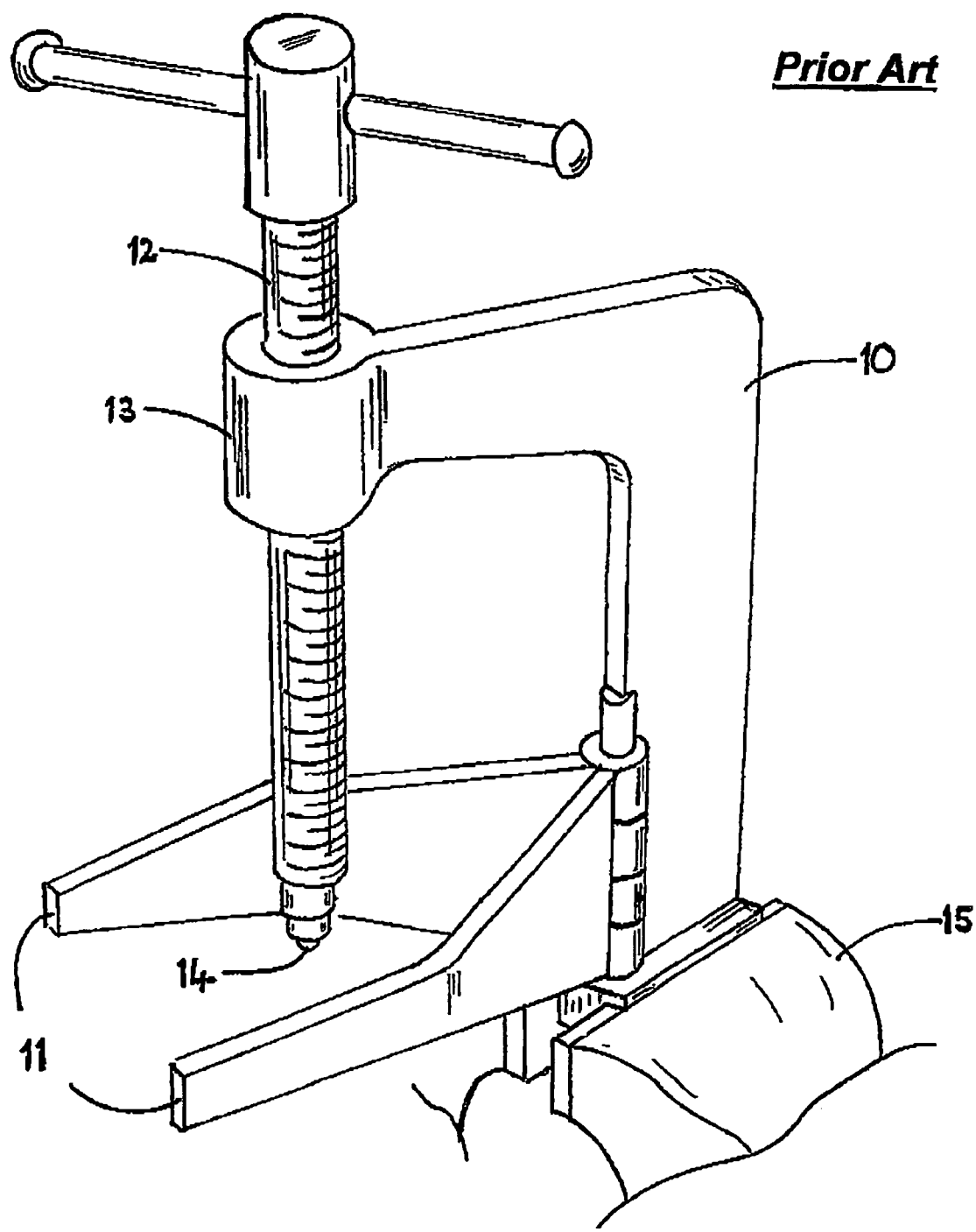
FIG. 1 is a perspective view of a small portable bearing press mounted in a vice.
Figure 2:
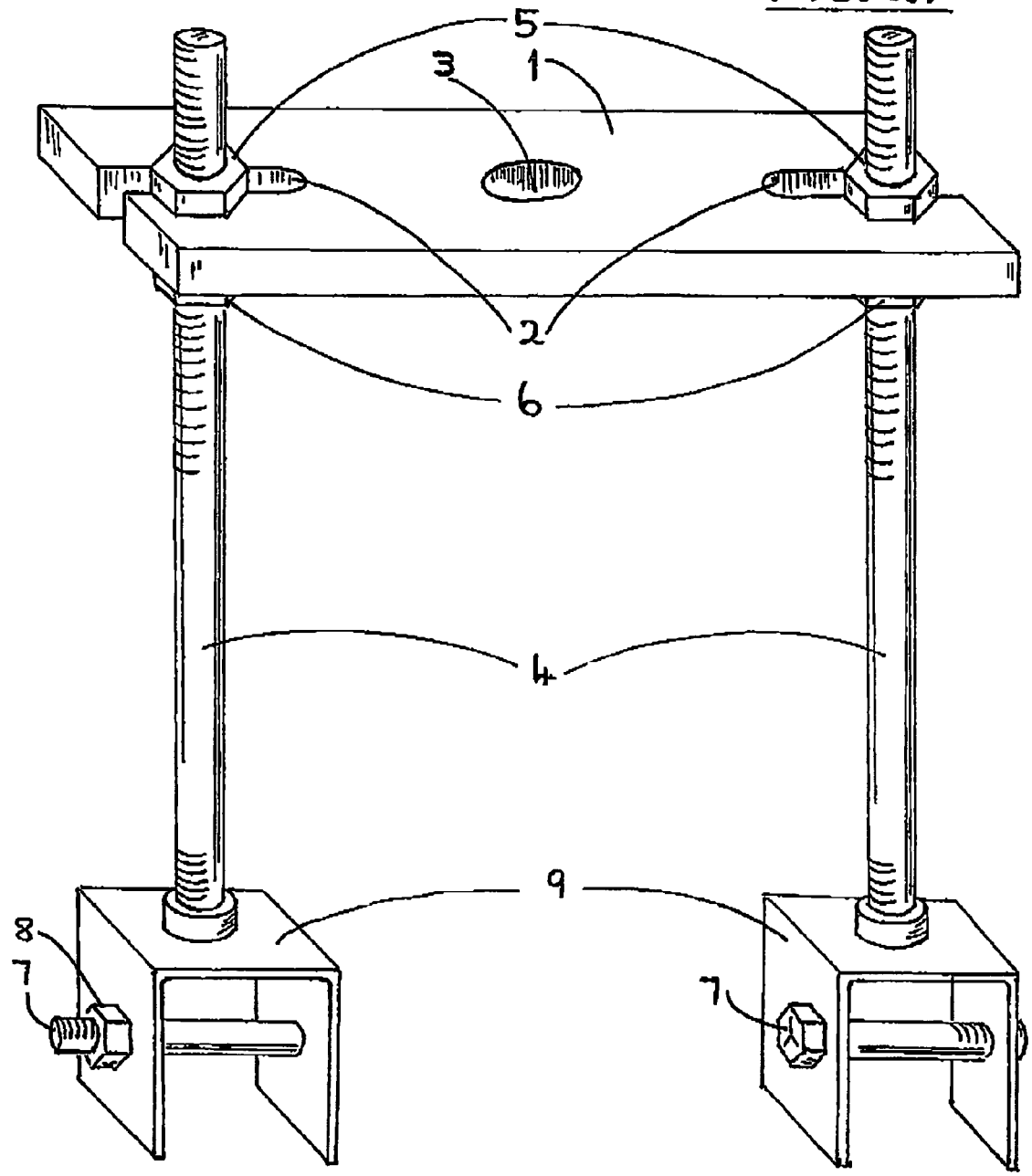
FIG. 2 is a perspective view of the preferred embodiment of the support adaptor assembly.
Figure 3:
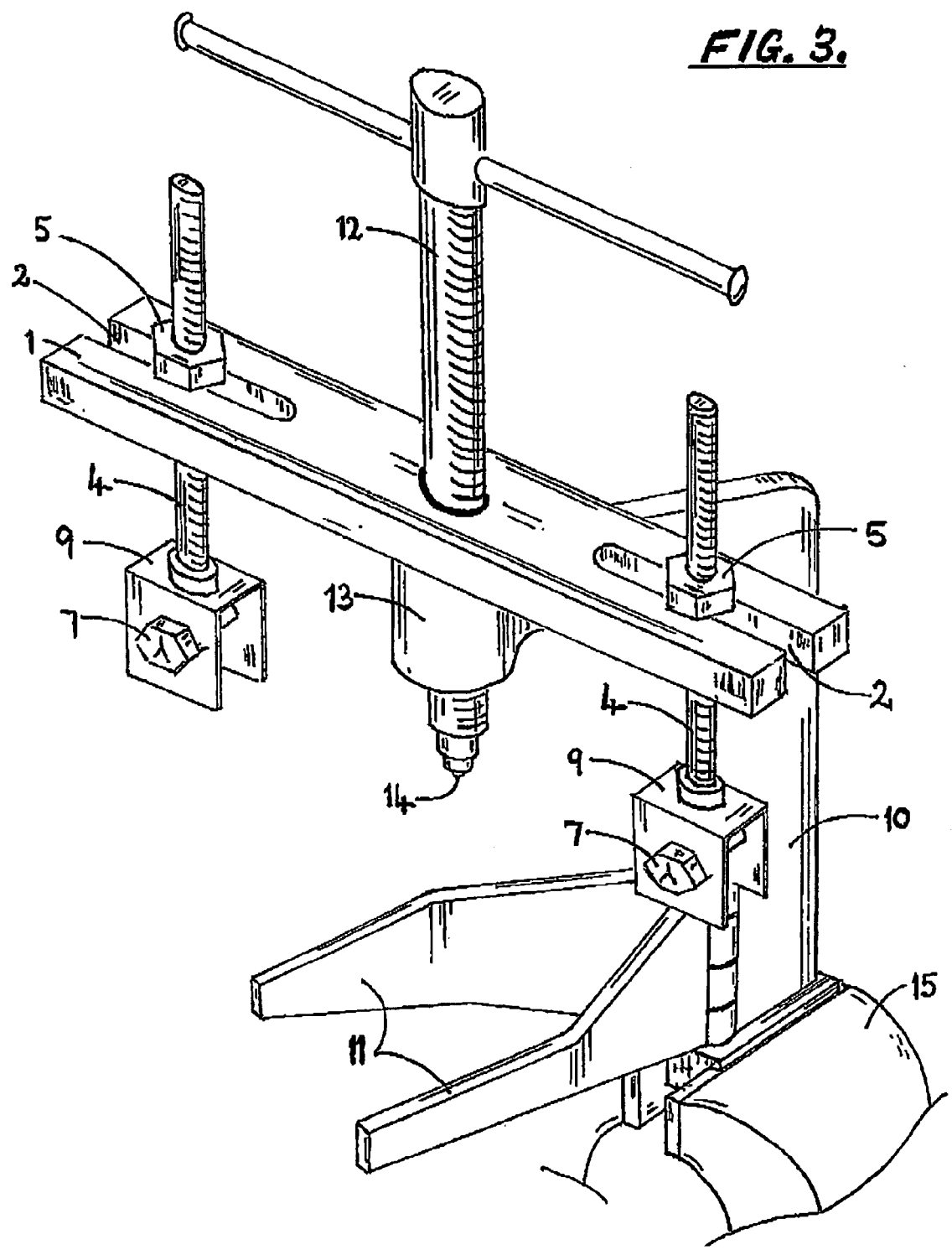
FIG. 3 is a perspective view of the preferred embodiment of the support adaptor assembly mounted on a small portable bearing press.
Figure 4:
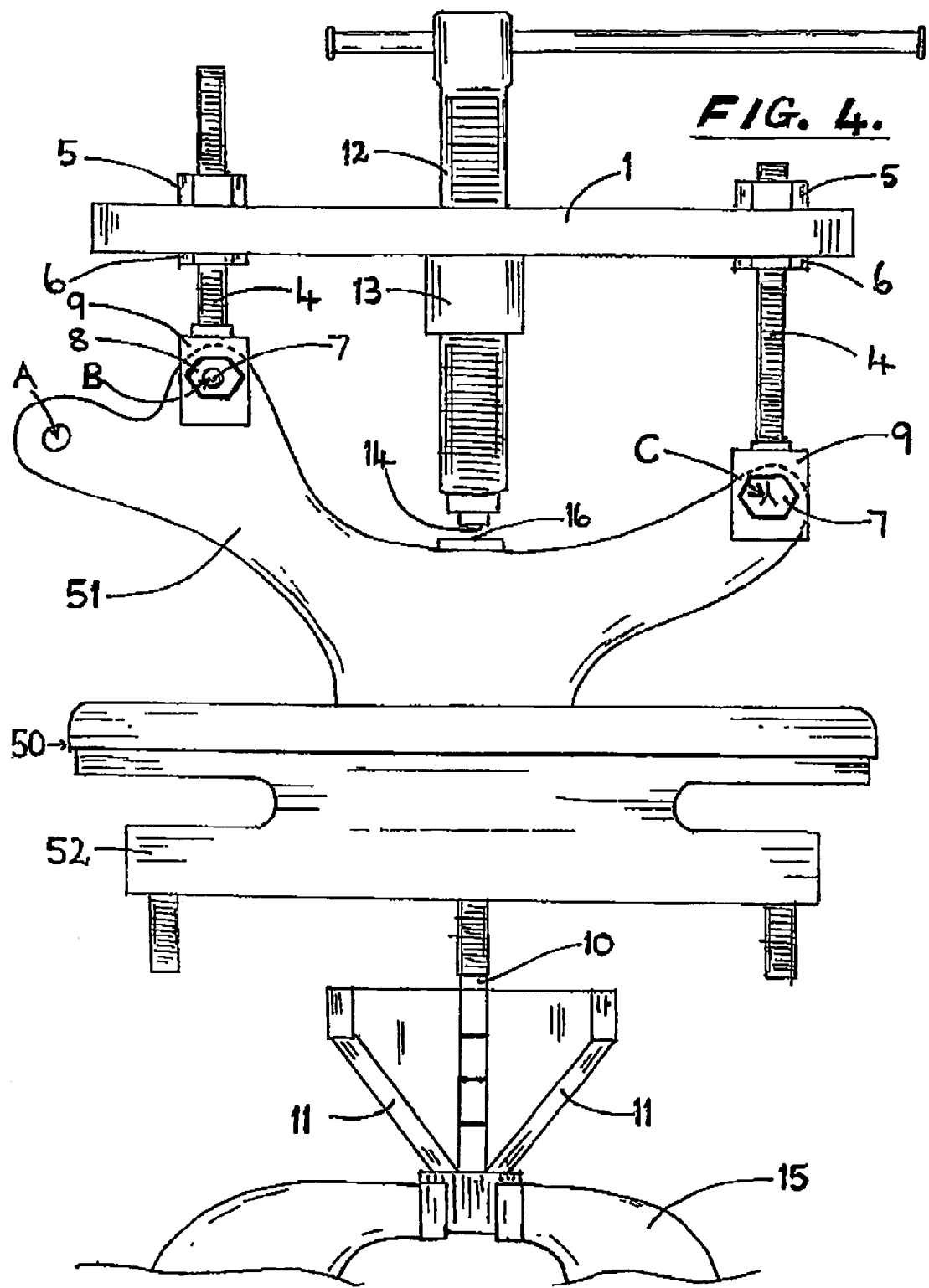
FIG. 4 is a front elevational view of the preferred embodiment of the support adaptor assembly mounted on a small portable bearing press showing an object comprising two press fitted components mounted on the support adaptor assembly.

The preferred embodiment of the support adaptor assembly shown in FIGS. 2, 3, 4 and 5 is adapted to be used with a bearing press such as is shown in FIG. 1 for working on an object, generally identified by the number 50 in FIG. 4 which comprises two main press-fitted components referred to hereafter as the inner component 51 and the outer component 52. Said bearing press being mountable in a vice 15 and comprising an upright frame 10, a vertical screw pressing shaft 12, a threaded shaft mounting 13 and two support arms 11 having a horizontal plane along and across the top edges relative to the vertical pressing shaft 12. In general terms the support adaptor assembly, shown in FIGS. 2, 3, 4 and 5, includes a header plate 1 and two elongate support rods 4 and an adaptor 9 mounted on one end of each rod 4 which together provide a means for supporting an object 50 to be worked on and shown in FIGS. 4 and 5.

With reference to FIG. 2, the preferred embodiment of the support adaptor assembly is shown as comprising a rectangular header plate 1 through which is formed a centrally located clear hole 3 and a slot 2 formed in each end. Mounted on the header plate 1, through the slots 2 provided in each end, are a pair of elongate threaded support rods 4 secured to the header plate 1 by nuts 5 and 6 tightened against both flat surfaces of the header plate 1. At the opposite end of each support rod 4, is attached a screw mounted stirrup shaped adaptor 9 through either side of which is located a bolt 7 with a nut on one end 8.

Figure 5:
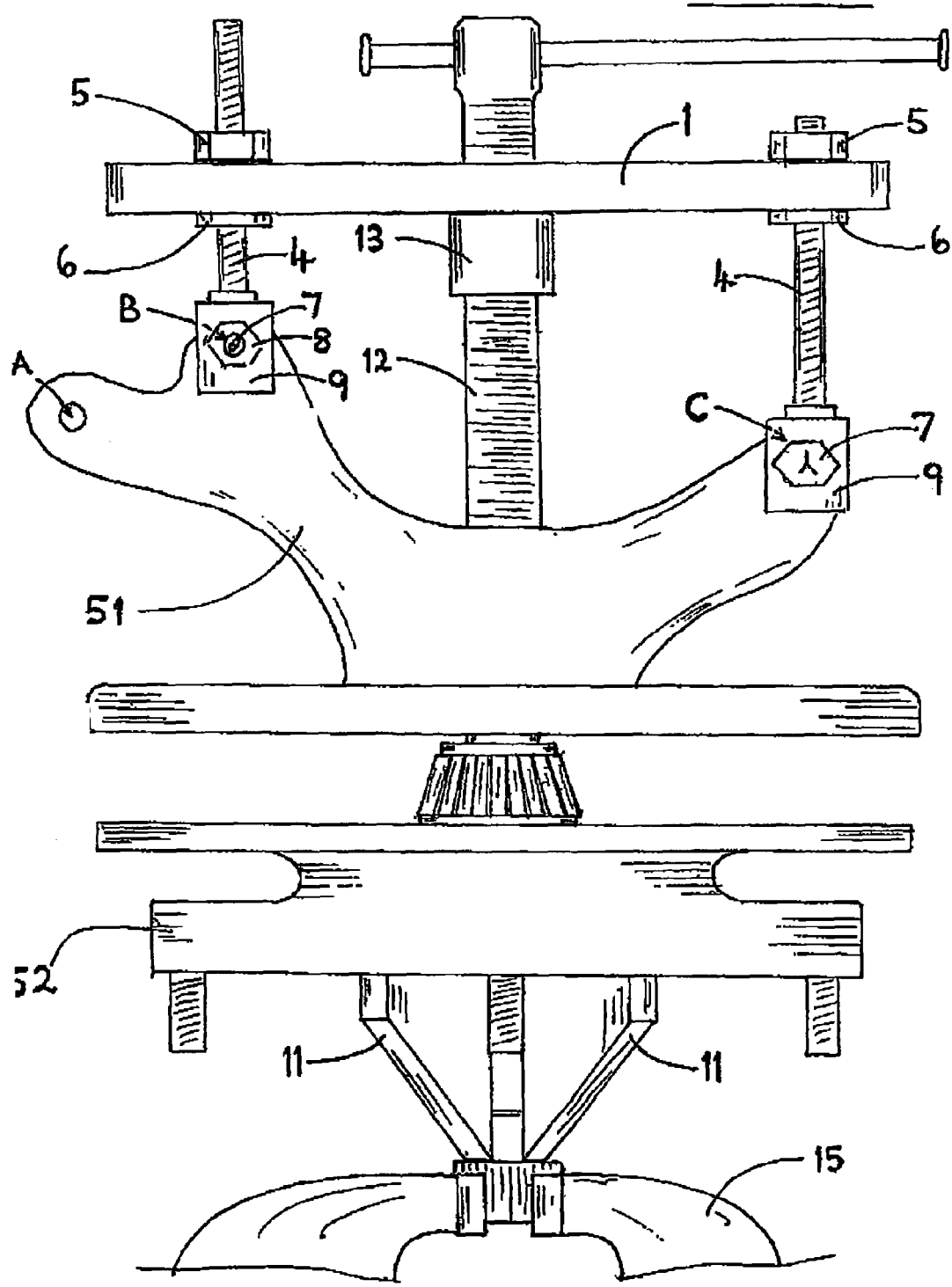
FIG. 5 is a front elevational view of the preferred embodiment of the support adaptor assembly mounted on a small portable bearing press showing one component of an object mounted on the support adaptor assembly and another component of the object supported on the support members of the bearing press.

The preferred embodiment of the present invention is shown in FIG. 2 comprising a header plate 1 through which is formed a centrally located hole 3 which provides a means for the header plate 1 to be centrally mounted on the bearing press frame as shown in FIGS. 3, 4 and 5. In order to mount the support adaptor assembly on to the bearing press shown at FIG. 1, the pressing shaft 12 is first screwed out of the threaded shaft mounting 13 and the header plate 1 of the support adaptor assembly is placed onto the top edge of the bearing press frame 10 and threaded shaft mounting 13 in a position whereby the hole 3 in the header plate 1 is in alignment with the hole of the threaded shaft mounting 13. In this position, the pressing shaft 12 is passed through the clear hole 3 in the header plate 1 and screwed into the threaded mounting 13 until the tip 14 of the pressing shaft 12 protrudes through the threaded mounting 13 as shown in FIG. 3.

In use, with the support adaptor assembly mounted on the bearing press, an object to be worked on can be supported by using adaptors screw fitted to the support rods 4.

In FIG. 4 an object 50 is shown supported by the support adaptor assembly so that the press-fitted components 51 and 52 of the object 50 can be separated by use of the pressing shaft 12 of the bearing press. In this case, the inner component 51 has a hole at points A, B and C and two of these, it points B and C respectively, have been utilised to support the inner component 51 by first aligning those holes with holes provided in the stirrup shaped adaptors 9 mounted on the support rods 4. This can be done by adjusting the length by which each support rod 4 extends below the header plate 1 and by adjusting the width by which the support rods 4 are spaced apart. With reference to FIGS. 3 and 4, there is provided in the header plate 1 a slot 2 in each end as a means of adjustment of the width by which the support rods 4 can be spaced apart or otherwise positioned relative to the header plate 1. In use, the nuts 6 on the support rods 4 located below the header plate 1 are loosened so that the support rods 4 can be free to be moved along the slots 2 provided in the header plate 1 until they are located in the desired position whereupon the nuts 6 on the support rods 4 may be tightened against the lower surface of the header plate 1 to secure the support rods 4 in position. The length by which the support rods 4 extend below the header plate 1 may also be adjusted by relocating the nuts 5 and 6 provided on the support rods 4 above and below the header plate 1 respectively. To increase the length by which a support rod 4 extends below the header plate 1, the nut 5 above the header plate is wound upwards along the support rod 4 until the desired length is attained whereupon the nut 6 below the header plate 1 is tightened against the lower surface of the header plate 1 to secure the support rod 4 in position. To decrease the length by which a support rod 4 extends below the header plate 1, the nut 6 on the support rod 4 below the header plate 1 is wound downwards along the support rod 4 until the desired length has been obtained and the nut 5 on the support rod 4 above the header plate 1 is then wound downwards along the support rod 4 and tightened against the upper surface of the header plate 1 to secure the support rod 4 in position.

When the support rods 4 have been adjusted to allow alignment of the holes in the sides of the stirrup shaped adaptors 9 mounted on the support rods 4 with the holes in the component 51 at points B and C, a bolt 7 is passed through each stirrup shaped adaptor 9 band the component 51 to mount the object 50 in the bearing press. A nut may be wound onto the bolt and tightened against the side of the stirrup shaped adaptor 9 to secure the object 50 in place. Further minor adjustment of the length by which the support rods 4 extend below the header plate, 1 or the width by which the support rods 4 are spaced apart, or otherwise positioned relative to the header plate, 1 may be necessary to locate the point 16, shown in FIG. 4, to which pressure needs to be applied with the tip 14 of the pressing shaft 12 centrally below the tip 14 of the pressing shaft 12 and on a horizontal plane relative to the vertical direction of the pressing force represented by the vertical alignment of the pressing shaft 12.

The pressing shaft 12 then is wound downwards to apply a downward pressing force to the outer component 52 of the object which is shown in FIG. 5 separated from the inner component 51 and supported on the support members 11 of the bearing press. The outer component 52 remains mounted on the support adaptor assembly, and can be unattached by removing the bolts 7 from the stirrup shaped adaptors 9.

The above described invention thus overcomes a major disadvantage of bearing presses by providing a means of allowing the assembly and dismantling of many press fitted components which cannot be supported on the support members of bearing presses. The preferred embodiment described above has been designed for use with a small portable bearing press as shown in FIG. 1 which has a screw shaft pressing device 12. However, it can be easily modified to be mounted on most bearing presses without departing from the spirit and scope of the invention. Similarly, the preferred embodiment of the invention has been designed with stirrup shaped adaptors 9 mounted on support rods 4 shown in FIG. 2, to provide a means for supporting the object 50 shown in FIGS. 4 and 5. However, other adaptors can be designed and mounted on the threaded support rods 4, or other devices such as chains and shackles, to suit various types of objects which require the use of the support adaptor assembly for press fitting or removing components, without departing from the spirit and scope of the invention.

The invention claimed is:

1. A bearing press comprising:
   a frame that has an internally treaded mounting;
   an externally threaded pressing shaft for providing a pushing force to a component, the pressing shaft being received in the internally threaded mounting; and
   a support adaptor assembly having an elongate rectangular shaped header plate, which has a slot in either end and a centrally located unthreaded hole, two support rods that are each received in one of the slots in the header plate and extend downwards relative to the direction of the pushing force of the pressing shaft comma the length of each support rod below the header plate being adjustable, and a stirrup shaped adaptor attached to an end of each support rod for connecting an object to the support rods and locating the object relative to the header plate such that the pressing shaft can push a component into the object, the header plate being located above the internally threaded mounting such that the pressing shaft extends through the centrally located unthreaded hole and the internally threaded mounting.

2. A bearing press as claimed in claim 1, wherein each stirrup shaped adaptor has a bolt with a shank that extends through holes in opposing legs of the respective stirrup shaped adaptor.

3. A bearing press as claimed in claim 1, wherein the component is a bearing, and the forward end of the pressing shaft has a tip for engaging with the bearing.

4. A method for pushing a component into an object, the method comprising:
 using the bearing press of claim 1
 locating the support adaptor assembly on the frame such that the header plate is located above the internally threaded mounting and the pressing shaft extends through the centrally located unthreaded hole and the internally threaded mounting;
 attaching the object to the stirrup shaped adaptors;
 locating the component between the object and the forward end of the pressing shaft; and
 winding the pressing shaft downward to apply a pressing force on the component to press the component into the object.

5. A method as claimed in claim 4, further comprising selecting the length of the two support rods below the header plate.

6. A method as claimed in claim 4, further comprising selecting the position of each support rod in the respective slot.

* * * * *

UNITED STATES PATENT AND TRADEMARK OFFICE
CERTIFICATE OF CORRECTION

| | |
|---|---|
| PATENT NO. | : 7,272,886 B2 |
| APPLICATION NO. | : 10/512110 |
| DATED | : September 25, 2007 |
| INVENTOR(S) | : David John Thomson |

It is certified that error appears in the above-identified patent and that said Letters Patent is hereby corrected as shown below:

In Claim 1, col. 4, line 62 insert --,-- after "shaft";

In Claim 1, col. 4, line 63, delete "comma"; and

In Claim 4, col. 5, line 15, insert --;-- after claim 1.

Signed and Sealed this

Twenty-ninth Day of April, 2008

JON W. DUDAS
*Director of the United States Patent and Trademark Office*